Feb. 12, 1957 J. J. BLACK 2,781,231
HUB CONSTRUCTION
Filed Dec. 31, 1953 2 Sheets-Sheet 1

INVENTOR.
James J. Black.
BY
Wood, Herron & Evans.
ATTORNEYS.

Feb. 12, 1957 J. J. BLACK 2,781,231
HUB CONSTRUCTION
Filed Dec. 31, 1953 2 Sheets-Sheet 2
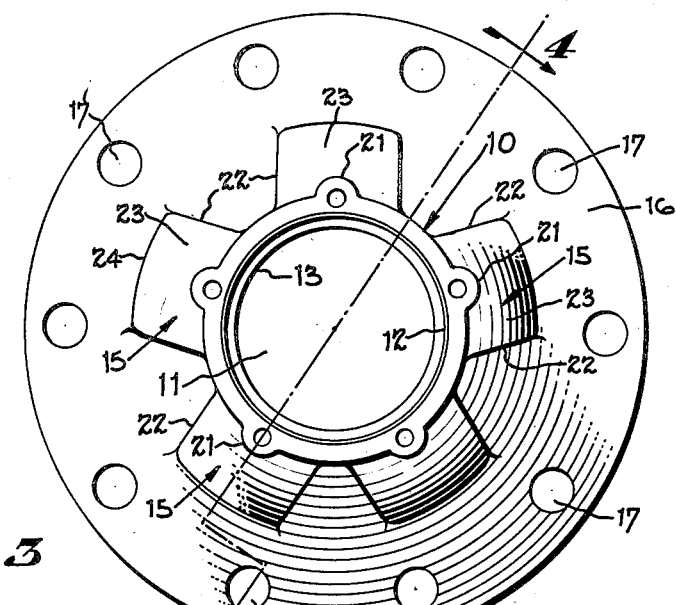
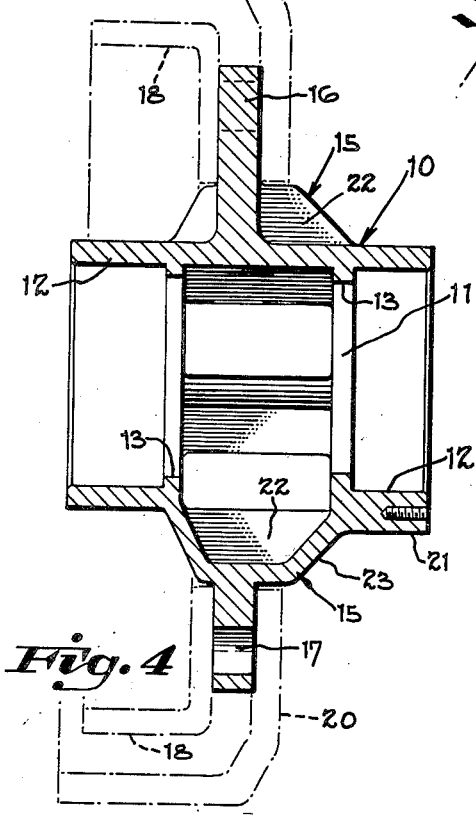
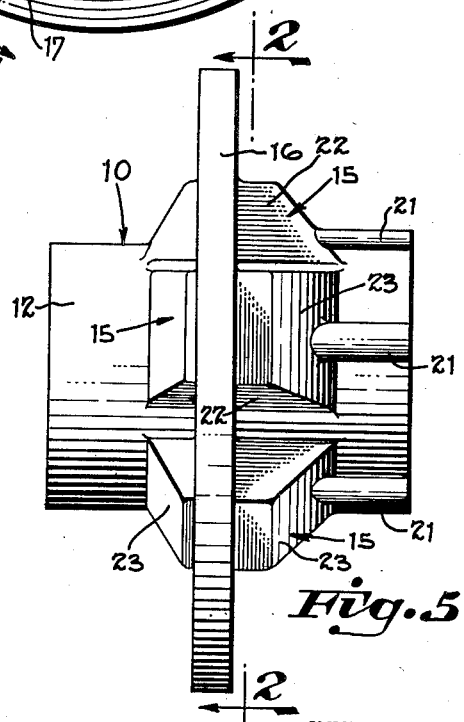
INVENTOR.
James J. Black.
BY Wood, Herron & Evans,
ATTORNEYS.

2,781,231

HUB CONSTRUCTION

James J. Black, Cincinnati, Ohio, assignor to Trailmobile, Inc., Chicago, Ill., a corporation of Delaware Application December 31, 1953, Serial No. 401,531

3 Claims. (Cl. 301—105)

This invention relates to hub constructions and is particularly directed to hubs for use in connection with heavy duty wheels, such as those employed on trucks and other commercial vehicles.

In a conventional wheel assembly, a hub is mounted adjacent to one end of an axle arm by means of a spaced pair of antifriction bearings. The hub generally includes a circular mounting flange to which a brake drum and wheel are bolted and thereby demountably secured to the hub. The entire load of the vehicle is transmitted from the axle through the hubs to the wheels. Since the hubs are secured directly to the axle by means of antifriction bearings, such as roller bearings, or the like, and are bolted to the wheels, there are no springs or other resilient members to absorb any of the road shocks and the full impact of these shocks is applied to the hub. As a result, a hub is subjected not only to the normal vehicle load, but also to severe shock loads as well; this combination of loads develops severe stresses in the hub and at times causes cracks and other failures.

At the present time, a substantial number of hubs are of forged construction, while the remainder are cast. Each of these different hubs, however, is subject to one or more disadvantages. In the first place, in order to impart sufficient strength to the hubs, their walls are generally made quite thick. Consequently, the hubs are either very heavy, which is highly disadvantageous since their momentum adds appreciably to the load on the brakes; or else in order to minimize weight various special light weight metals such as Duralumin, or the like, are used. The use of such metals greatly adds to the cost of the hub since they are considerably more expensive than steel. Furthermore, thick walled cast hubs have certain inherent weaknesses which increase the likelihood of their failure in service. For example, it is well known that thick wall castings are difficult to cool properly, and tend to develop cracks; also the metal in the thickened area has an increased porosity which weakens it.

The principal object of the present invention is to provide a thin walled cast hub which is light in weight and yet is extremely strong so that the hub will not fail under any load to which it is subjected.

More specifically, a hub constructed in accordance with the present invention includes two spaced cylindrical bearing rings joined by a plurality of longitudinally extending box-like ribs. A radial mounting flange extends outwardly from the box-like ribs from a point intermediate the two bearing rings. The radial flange includes a plurality of bolt holes for joining the hub to the brake drum and wheel. In the preferred embodiment, each of the box-like ribs includes a pair of axial side walls, sloping transverse end walls and an outer wall extending longitudinally of the hub and having an arcuate cross section concentric with the bearings. The lowermost edges of the adjacent ribs are connected together by means of arcuate inner walls so that the ribs have a continuous corrugated, or sinuous, cross section.

In the preferred embodiment these ribs perform three functions. In the first place they form stiffening beams for rigidifying the hub portion lying intermediate the two bearing surfaces. Secondly, they constitute a support on both sides of the radial flange which is generally the hub element most likely to fail. In addition, the box-like ribs form elements facilitating the securance of the hub and demountable wheel. That is the sloping end walls of the ribs form a cam or guide surface for centering the wheel flange on the hub. Then after the wheel has been shifted over the outer walls of the ribs, these walls are effective to support the wheel while it is bolted to the mounting flange.

One of the principal advantages of the present hub is that despite the fact that it is extremely strong and rigid, the thickness of its individual walls is substantially reduced from the thickness of the walls of previously available hubs. As a result, a hub of the present invention weighs only approximately half as much as a conventional hub constructed of the same material.

Another advantage of the present hub is that its configuration greatly facilitates the mounting of a wheel on the hub. This feature is of particular importance since the hubs are primarily intended for use with heavy wheels of the type used on trucks, tractor trailers, and the like. In the present hub, the bolt flange is disposed in the middle of the hub, remote from either end. The arcuate outer walls of the ribs are disposed adjacent to the bolt holes to form a supporting surface upon which the wheel flange may be rested while the wheel is bolted in place. The slanted end walls further facilitate the mounting of a wheel by providing guide surfaces for camming the wheel into a position in which it is centered on the hub. That is, as the wheel is slipped over the end of the hub, if it is not properly centered, the sloping end walls of the ribs engage the wheel flange, urging it in the proper direction for centering. These end walls remain in contact with the wheel flange until it is properly positioned to fit over the outer walls.

In the preferred embodiment, the outer walls of the ribs also form a pilot or supporting surface for the brake drum, thereby also facilitating the securance of the brake drum and hub mounting flange. As explained below, depending upon the specific wheel and brake drum construction, the wheel may be supported by the portion of the outer walls disposed on one side of the mounting flange while the brake drum is supported by the portion of the outer walls on the opposite side of the flange; or alternatively both the drum and wheel can be supported on the same side of the flange.

These and other advantages of the present invention will be apparent from a consideration of the following detailed description of the drawings illustrating a preferred embodiment of the invention. In the drawings, Figure 1 is a perspective view of a hub.

Figure 3 is an end view of the hub.

Figure 4 is a longitudinal cross sectional view taken along line 4—4 of Figure 3.

Figure 5 is a side view of the hub.

Figure 1:
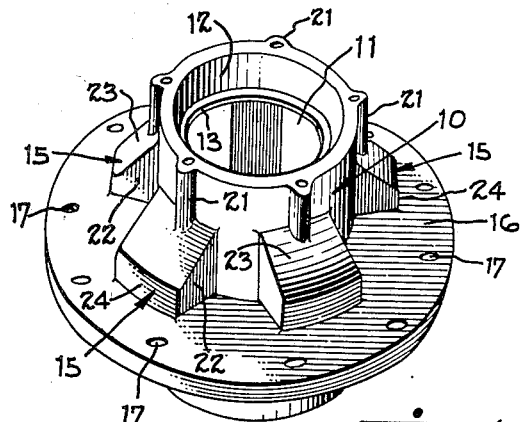

As shown particularly in Figures 1 and 4, a hub 10 constructed in accordance with the present invention comprises a casting of steel or other suitable material having a longitudinal axle opening 11 extending therethrough. Each end of the hub includes a cylindrical section which is counterbored to form ring-like members 12 and inner shoulders 13 for receiving the outer races of antifriction bearings (not shown). These races are pressed into the ends of the hub and seat against the rings and shoulders. It will be understood that the inner races of these bearings are carried by the axle arm (not shown). The hub is thus rotatably mounted upon the axle arm by means of two longitudinally spaced bearings.

Intermediate the two generally cylindrical ring members 12 the hub includes a plurality of box-like ribs 15 which extend longitudinally of the hub and present a continuous corrugated cross section. A radial mounting flange 16 extends outwardly from the ribs and is provided with a series of bolt holes 17. These bolt holes are preferably equally spaced along the circumference of a circle and are adapted to receive suitable studs for securing a brake drum 18 and wheel assembly 20 to the hub. A plurality of small axial bosses 21 are provided adjacent to the outer wall of one bearing ring 12. These bosses are threadably bored for receiving bolts by means of which a cap (not shown) is mounted over the end of the hub.

Figure 2:
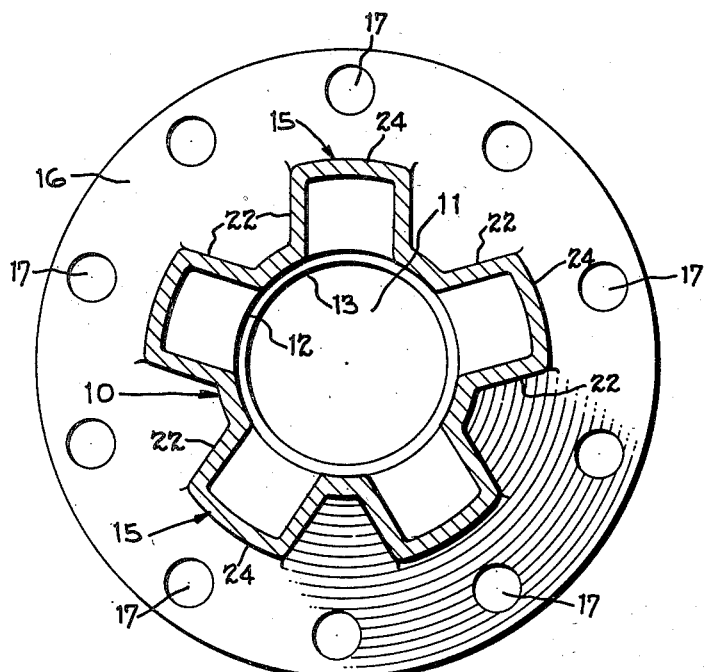
Figure 2 is a transverse cross sectional view of the hub taken along line 2—2 of Figure 5.

More specifically, each box-like rib 15 includes a pair of axial or longitudinal upstanding side walls 22, a pair of transverse sloping end walls 23 joining the two side walls and an arcuate outer wall 24 disposed concentrically with rings 12 and the bolt circle. The outer wall extends axially of the hub on opposite sides of radial mounting flange 16. The inner ends of adjacent side walls of adjoining ribs are interconnected by means of a plurality of arcuate inner walls, preferably of the same diameter as the cylindrical ring members 12. Thus the ribs present a continuous corrugated or sinuous cross section, as best shown in Figure 2.

In the preferred embodiment, the outer wall of each of the box-like ribs is spaced inwardly from the bolt circle by the same amount. These outer walls are effective to form a pilot or supporting surface on which the inner flange of a demountable wheel can be rested while the wheel is bolted to the radial flange. In a similar fashion the segments of the outer walls on the opposite side of the radial flange function as a pilot for the brake drum shown in Figure 4. It is contemplated, however, that if desired the brake drum and wheel may both be secured to the same side of flange 16, in which case the same segments of the outer walls serve as a pilot for both members. The sloping end walls enclose the ribs and function to cam or guide the wheel into position as it is slipped over the edge of the hub.

The longitudinal ribs perform two functions in addition to that of guiding and supporting the wheel and brake drum. In the first place, the ribs support the radial flange which is inherently one of the weakest elements of the hub. The flange is supported from both sides by ribs extending a substantial distance from the center toward the flange periphery. In addition, the ribs also function as longitudinal load carrying beams which rigidify that portion of the hub intermediate the two ring ends.

By disposing the radial mounting flange in the central portion of the hub and by supporting it on both sides with ribs extending a substantial distance from the axis of the hub toward the periphery of the mounting flange, an extremely strong construction is provided and the hub wall thickness may be substantially reduced from that found in conventional hubs.

When mounting a wheel on the hub, the circular opening of the wheel flange is brought into registry with bearing ring 12, and the wheel is shifted inwardly along the hub. If the wheel is not centered properly, a portion of the wheel flange will strike one or more of the sloping rib walls 15. As the wheel is forced further inwardly toward the mounting ring, the end walls function as cams urging the wheel into its proper position. When the wheel is properly centered, the wheel flange fits over the top walls of each of the ribs, as indicated in Figure 4. The top walls support the wheel, while the bolt holes in the wheel flange are aligned with studs which are press fitted into the bolt holes in the mounting flange. After the wheel has been forced inwardly so that the studs protrude through the openings in the wheel flange, nuts are threaded over the studs and are tightened down to firmly secure the wheel to the hub. Finally, a suitable cap is secured over the end of the hub by threading bolts into the openings provided in bosses 21.

Having described my invention, I claim:

1. A wheel hub comprising a pair of spaced cylindrical bearing rings, said bearing rings being counterbored for the reception of wheel bearings, a plurality of ribs disposed intermediate said bearing rings, each of said ribs comprising longitudinal side walls, transverse end walls joining said side walls, and an outer wall, said outer wall extending axially of said hub, a plurality of arcuate inner walls interconnecting the adjacent side walls of adjoining ribs, a radial mounting flange extending outwardly beyond the ribs intermediate their end walls, said mounting flange being provided with a plurality of bolt holes adapted for the reception of studs for securing said flange to a wheel, said bolt holes being disposed about the circumference of a bolt hole circle, the outer wall of each of said ribs being arcuately configurated and being disposed concentrically with said bolt hole circle, whereby said outer walls function as a pilot surface for supporting a wheel during the mounting thereof.

2. A wheel hub comprising a pair of spaced cylindrical bearing rings, said bearing rings being counterbored for the reception of wheel bearings, a plurality of ribs disposed intermediate said bearing rings, each of said ribs comprising longitudinal side walls, transverse end walls joining said side walls, and an outer wall, said outer wall extending axially of said hub, a radial mounting flange extending outwardly beyond the ribs intermediate their end walls, said mounting flange being provided with a plurality of bolt holes adapted for the reception of studs for securing said flange to a wheel, said bolt holes being disposed about the circumference of a bolt hole circle, the outer wall of each of said ribs being arcuately configurated and being disposed concentrically with said bolt hole circle, whereby said outer walls function as a pilot surface for supporting a wheel during the mounting thereof, the end walls adjacent to one bearing ring sloping inwardly toward the radial flange to form guide surfaces for centering said wheel.

3. A wheel hub comprising a pair of spaced cylindrical bearing rings, said bearing rings being counterbored for the reception of wheel bearings, a plurality of ribs disposed intermediate said bearing rings, each of said ribs comprising longitudinal side walls, transverse end walls joining said side walls, and an outer wall, said outer wall extending axially of said hub, a radial mounting flange extending outwardly beyond the ribs intermediate their end walls, said mounting flange being provided with a plurality of bolt holes adapted for the reception of studs for securing said flange to a wheel, said bolt holes being disposed about the circumference of a bolt hole circle, the outer wall of each of said ribs being arcuately configurated and being disposed concentrically with said bolt hole circle, a portion of said outer wall being disposed on each side of said flange, whereby said outer walls function as a pilot surface for supporting a wheel on one side of the flange and a drum on the other side of the flange while these members are secured to the flange.

References Cited in the file of this patent

UNITED STATES PATENTS

| | | |
|---|---|---|
| 1,552,102 | Williams | Sept. 1, 1925 |
| 1,646,863 | Hunt | Oct. 25, 1927 |
| 1,675,630 | Ash | July 3, 1928 |

FOREIGN PATENTS

| | | |
|---|---|---|
| 1,010,066 | France | Mar. 12, 1952 |